United States Patent
Herbenar

[15] 3,686,742
[45] Aug. 29, 1972

[54] METHOD OF MANUFACTURING BALL JOINT

[72] Inventor: Edward J. Herbenar, Detroit, Mich.
[73] Assignee: TRW Inc., Cleveland, Ohio
[22] Filed: May 25, 1970
[21] Appl. No.: 40,316

[52] U.S. Cl. ..................29/441, 29/510, 29/517, 10/152, 85/32 V, 220/39, 287/87
[51] Int. Cl. .............................................B23p 11/00
[58] Field of Search...............29/516, 437, 441, 510; 85/32 V; 287/87; 220/39; 10/152

[56] References Cited

UNITED STATES PATENTS

| 1,619,901 | 3/1927 | Washburne | 10/152 R X |
| 3,395,441 | 8/1968 | Herbenar | 29/510 X |

FOREIGN PATENTS OR APPLICATIONS

| 22,402 | 12/1961 | East Germany | 85/32 V |
| 541,144 | 1/1932 | Germany | 29/516 |

*Primary Examiner*—Charlie T. Moon
*Attorney*—Hill, Sherman, Meroni, Gross & Simpson

[57] ABSTRACT

A method of manufacturing an internally-threaded plug-closed ball joint which comprises the steps of forming a ball joint housing having an opening in one end through which the shank of a ball-ended stud may project and an opening in the other end for inserting the stud and other internal components, placing a male threaded plug in the other opening to a desired height, the threads of the male threaded plug having a major diameter equal to or less than the diameter of the opening, and spin-swedging the housing from the exterior thereof to flow housing metal into the grooves of the plug whereby internal threads are formed in the housing.

3 Claims, 7 Drawing Figures

INVENTOR.
EDWARD J. HERBENAR

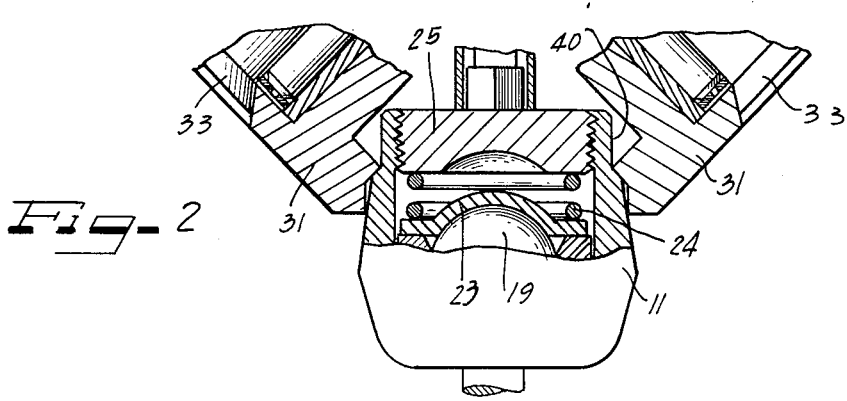
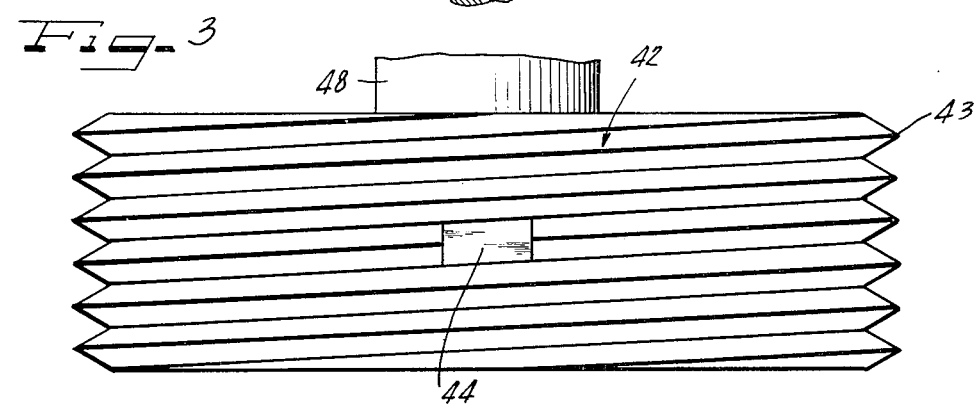
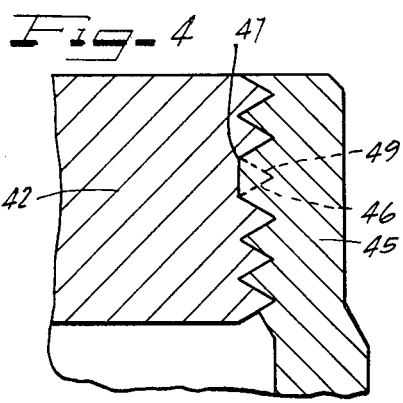
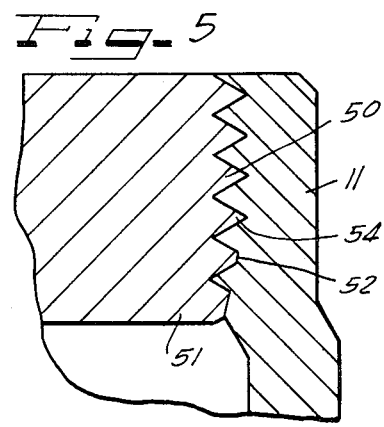
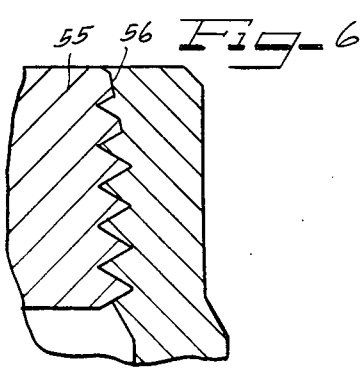
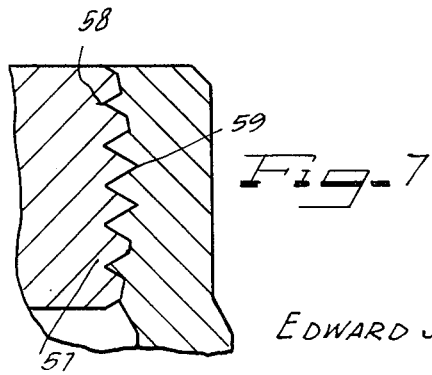
INVENTOR.
EDWARD J. HERBENAR

METHOD OF MANUFACTURING BALL JOINT

BACKGROUND OF THE INVENTION

1. Field of the Invention

This invention relates to ball joints and more particularly to a method of manufacturing an internally threaded plug-closed ball joint.

2. Prior Art

Movable stud joints, generally called ball joints, normally have a housing which has an opening therethrough communicating to an internal pocket. The pocket contains the ball end of the stud and other housing components such as anti-friction bearing blocks, wear takeup devices and the like. The shank of the stud projects through the opening and the stud is pivotable with respect to the housing. In order to retain the stud in the housing, the ball end of it normally has a diameter greater than the diameter of the opening or of the stacked bearing components in which the ball end is received which in turn will have diameters greater than the opening so as to be restrained against falling out of the pocket through the shank opening. In order to stack the components in the pocket, the pocket normally has another larger diameter opening through the housing through which the components can be inserted into the housing.

It has been known to close the larger diameter opening by means of a retaining plate which normally rests against in internal shoulder with a portion of the housing being peened over the plate, thereby entrapping it between the peened-over portion and the shoulder. It has also been known to entrap the plate in the housing by spin-swedging the housing thereby reducing the external diameter around the housing area having the plate. This method flows the metal of the housing radially inwardly in such a way to surround and entrap the plate. (See for example my U.S. Pat. No. 3,395,442.)

These methods permanently close the large diameter opening of the housing and provide an unadjustable joint insofar as the pressure on the stacked components caused by the load pressure of the closure plate cannot be adjusted after peening or swedging. These methods also produce a joint in which the components cannot normally be removed from the housing to check for wear or to facilitate replacement.

In order to provide adjustable and replaceable component joints, it has been known to close the large-diameter opening with a threaded plug which can thereafter be screwed inwardly to tighten the thrust on the components or unscrewed to inspect for wear or to replace the components. The manufacture of such threaded plug-closed joints is complicated by the necessity to machine the threads on both the exterior of the plug and the interior of the housing prior to assembly of the two. Assembly is therefore complicated by the necessity of direct alignment and rotating attachment necessitated by the indexing threads. A further difficulty lies in the fact that in order to maintain the plug in the housing at the desired level to achieve required component loading, the index between the male and female threads must be sufficiently tight to prohibit loosening of the plug from the housing during the oftentimes jarring aberration of the vehicle in which the joint is to be utilized. This has required extremely close tolerance manufacture of both the externally threaded plug and the internally threaded housing.

SUMMARY OF THE INVENTION

These disadvantages of the prior art threaded plug closed housings are overcome by the present method which eliminates the necessity of internally threading the housing in a separate operation and thereafter threading the plug into the housing. Further, the method provides a system whereby the plug may be locked in place at the desired depth in the housing with a predetermined force requirement to overcome the lock.

In the primary embodiment, the invention utilizes a male threaded plug which is positioned in the large diameter opening of an unthreaded housing and is thereafter subjected to the desired force to push the plug against the components until the components have reached the desired level of pre-loading. Thereafter, the large diameter end of the housing is spin-swedged around the plug to constrict the large diameter end of the housing in such a manner that the metal of the large-diameter end flows into the male threads of the plug forming female threads on the inner diameter of the large diameter end of the housing.

In another embodiment, in order to provide locking of the plug in the housing at the swedged level, a portion of the male thread of the plug is interrupted with a gap. During the swedging operation, housing material will fill the gap thereby locking the plug against rotation. Application of a sufficient degree of torque to the plug will cause the male thread to cut a new path through the interrupted portion thereby allowing unthreading of the plug. In other embodiments, either one end or both ends of the male threaded plug can be reduced in diameter after formation of the threads. This results in a lessened major diameter for the male threads which after swedging results in a lessened minor diameter for the female threads. This will then inhibit movement of the male threaded plug with respect to the housing in either one or both axial directions.

It is therefore an object of this invention to provide a new method of manufacture of joints.

It is a further and more important object of this invention to provide a new method of assembling joints.

It is still another object of this invention to provide a new and improved method of assembling threaded plug-closed ball joints.

It is a further and more specific object of this invention to provide a new and improved method of assembling threaded plug-closed ball joints wherein a pre-threaded male plug is positioned to a desired depth in an unthreaded housing and thereafter the housing is spin-swedged to constrict the metal of the housing thereby forming female threads on the inner diameter wall of the housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2 is a fragmentary cross-sectional view illustrating the machine and joint housing of FIG. 1 when the machine has substantially completed the swedging operation.

FIG. 3 is a fragmentary plan view of the male threaded plug used in practicing this invention.

FIG. 4 is a fragmentary cross-sectional view of the plug of FIG. 3 received in a swedged housing.

FIG. 5 is a view similar to FIG. 4 illustrating a modified embodiment of this invention.

FIG. 6 is a view similar to FIG. 5 illustrating another modified embodiment of this invention.

FIG. 7 is a view similar to FIGS. 4 through 6 illustrating another embodiment of this invention.

DESCRIPTION OF THE PREFERRED EMBODIMENTS

Figure 1:
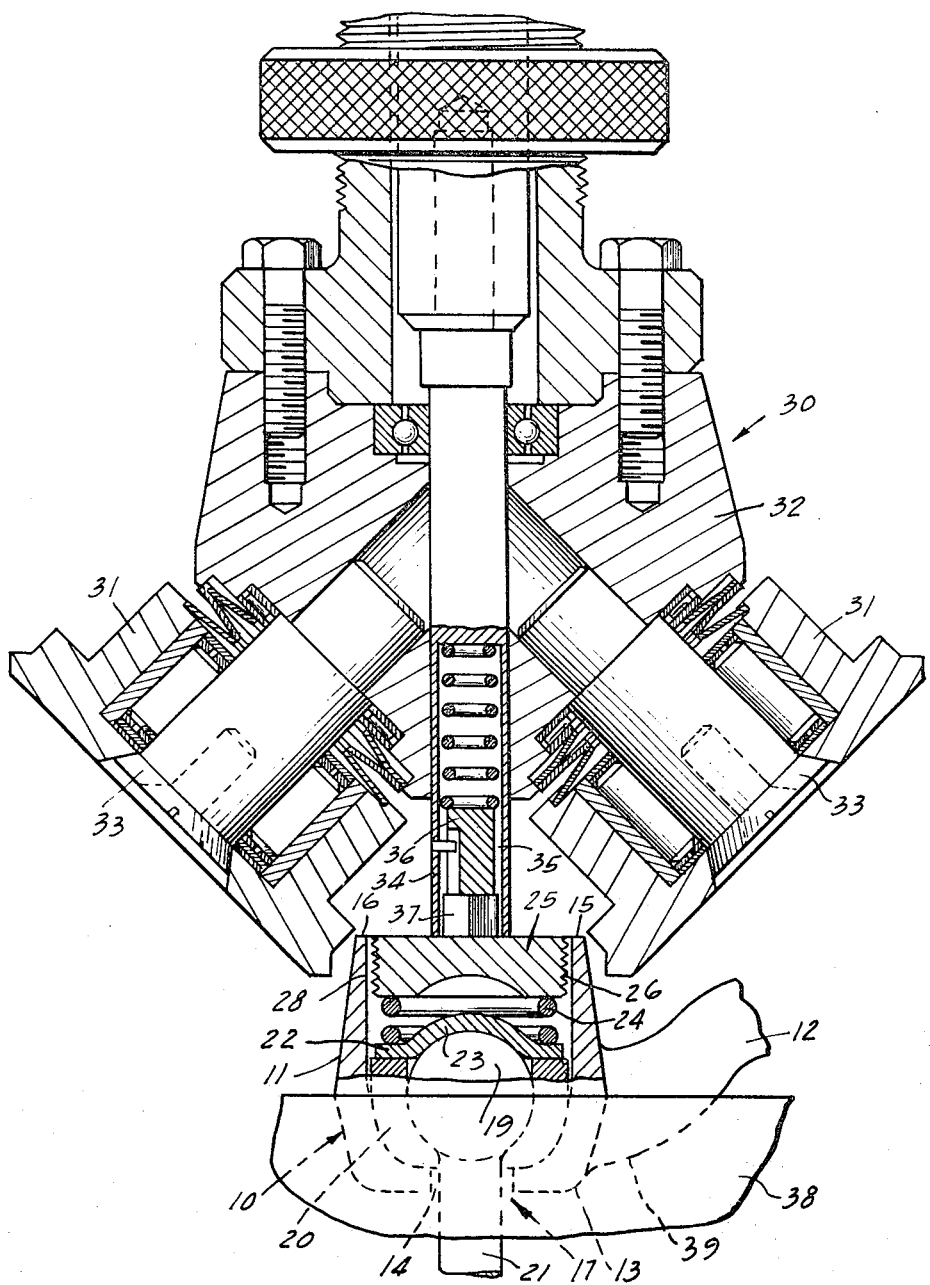
FIG. 1 is a fragmentary cross-sectional view of a spin-swedge machine as used in practicing the method of this invention in initial operating position prior to swedging a plug threaded housing.

FIG. 1 illustrates a movable stud joint 10. The joint 10 has a cup-shaped housing 11 integrally attached to the end of a connecting arm 12. The housing 11 has a cylindrical outer wall 12 which terminates at one end in a bottom wall 13 pierced by a central aperture 14. The other end 15 has a large diameter opening 16 therein. The movable ball-ended stud 17 is received in the housing 11 with the ball end 19 thereof received in a bearing block 20 and the shank 21 of the stud 17 projecting through the small diameter opening 14. The ball end 19 of the stud 17 is normally larger than the small diameter opening 14 so as to retain the stud within the housing 11. The bearing block 20 may be of a self-lubricating plastic and the ball end is rotatable therein thus allowing the shank 21 to move with respect to the housing 11.

A backing plate 22 having a central depression 23 is positioned over the bearing block 20 and ball end 19 of the stud with the ball end 19 received in the depression 23. The backing plate in turn is backed by a wear takeup spring 24 entrapped between the backing plate 22 and a closure plate 25. The closure plug 25 has outer diameter threads 26 thereon and is received in the large diameter opening 16 to close the opening.

The use of a threaded plug to close the large diameter opening of the housing allows the joint to be adjustable by tightening the plug. This increases the compression force on the spring 24 to take up any wear on the components of the joint. Further, the use of a threaded plug allows removal of the plug and access to the interior of the joint to check wear or to replace components. Normally, the inner diameter wall 28 of the housing will have mating threads to coact with the male threads of the plug. These female threads are normally provided by machining operations performed on the housing, which operations are expensive and require close tolerances. This invention provides the mating threads by a swedging operation which may be performed by a swedging machine 30 as illustrated in FIG. 1. The construction and operation of such a machine are explained in my U.S. Pat. No. 3,430,327, to which reference is hereby made. The swedging machine 30 has a plurality of rollers 31 received on the end of a rotatable head 32. The rollers 31 are mounted on pins 33 and are independently rotatable thereon. A central axial projection 34 depends from the head 32 interiorly of the rollers 31. The projection 34 does not rotate with the head 32. The projection 34 is hollow as at 35 and may contain therein a spring biased plunger 36. A nut head 37 on the end of the plug 25 is dimensioned to be received within the hollow section 35 of the projection 34 and be retained therein to prohibit rotation of the plug 25. The axial projection 34 is independently axially movable from the head 32 and the head and rollers 32 and projection 34 are movable towards and away from a base member 38 contoured as at 39 to receive the joint 10 with the large diameter opening 16 projecting above the base member 38.

The axial projection 34 is movable towards the base member 38 so as to accurately position a plug 25 carried by the axial projection 34 within the large diameter opening 16 of a joint 10 received in the depression 39. The axial projection 34 is normally controllable so as to exert a given pre-load compressive force on the components within the cup-shaped housing. In this manner, the plug 25 is inserted into the housing to a given depth at a given preload force to compress the components therein.

Because of the fact that there are no female threads on the housing when the plug is inserted thereinto, the depth of penetration of the plug into the housing is dependent only upon the stacking height of the components under the desired preload.

After the plug has been positioned in the housing, the head 32 containing the rollers 31 is lowered and spun to swedge the material of the wall 12 of the housing 11 radially inwardly. This constriction of the material 12 will cause it to flow into the male teeth of the plug 25 thereby forming female teeth on the inner diameter wall 28 of the housing. These teeth will correspond to the teeth of the plug 25 and will mate therewith.

After the swedging operation, the head 32 is withdrawn together with the axial projection 34. Thereafter, the plug may be removed and another inserted if desirable, however the joint formation between the plug and the housing according to this invention accomplishes a preload force on the components as determined by desired manufacturing specifications and therefore preferably the plug 25 is retained in the housing as the housing closure plug.

FIG. 2 illustrates the completed swedging operation prior to withdrawal of the rollers 31 from the housing 11. It is to be noted that the diameter of the housing in the area 40 surrounding the plug 25 has been reduced by the swedging operation. This is accomplished by cold-flow of the metal during swedging.

Because the female threads of the housing 11 are formed by cold-flow of housing metal material into the male threads of the plug 25, the resultant fit between the threads can be extremely close with the major diameters of the female threads substantially filling the grooves and bottoming against the minor diameter of the male threads. In such a situation, the plug would be tightly seated in the housing and unthreadable only with application of a large amount of torque. However, during operation of a vehicle equipped with such a ball joint, extreme vibration can occur. In order to insure against unthreading of the plug as a result of such vibration, the male thread of the plug can be interrupted in a localized portion. In the area of this interruption, the metal of the housing will flow into the thread interruption thereby providing a non-threaded area to lock the plug in place.

Such a plug is illustrated in FIG. 3. The plug 42 has a spiral thread 43 with a central localized interruption 44 or gap. The gap is illustrated as extending from the minor diameter of one groove through the metal of the tooth to the minor diameter of the next groove. As illustrated in FIG. 4, when the housing 45 is swedged inwardly, material 46 of the housing will flow into the gap 47 created by the interruption 44. This will lock the plug 42 against rotation until an extreme amount of torque is applied to the nut head 48. Application of a sufficient degree of torque will cause a cutting of a new female thread indicated by the dotted lines 49 through the area 46. Thereafter, the plug may be threaded and unthreaded in the normal manner.

FIG. 5 illustrates another embodiment wherein the threads are deformed by tapering the thread 50 at the bottom 51 of the plug. This is accomplished by reducing the major diameters 52 of the bottom-most threads. With such an embodiment, it can be seen that the plug can be unthreaded normally, however to thread it tighter into the housing 11, application of a considerable degree of torque will be required so that the untapered threads 54 will cut deeper female threads in the housing in those areas adjacent to the tapered portion of the plug when the housing was swedged.

FIG. 6 illustrates this modification in the reverse where the top 55 of the plug has the tapered threads 56. In this modification, the plug can easily be threaded further into the housing to increase compression on the components therein. However, application of a great degree of torque will be required to unthread the plug so as to cut deeper female threads to the depth of the major diameter of the male threads.

FIG. 7 illustrates a combination of modifications of FIGS. 5 and 6 with both tapered bottom 57 and top 58 grooves with the center grooves 59 normal. This modification will restrict threading or unthreading of the plug in the absence of a torque sufficient to cut deeper threads.

It can therefore be seen that my invention provides a new method of manufacturing a plug closed ball joint wherein the female threads in the joint are formed by spin-swedging the material of the housing inwardly against a male threaded plug received in the housing. This invention also teaches restriction of rotation of the plug within the housing by deformation of localized areas of the plug threaded prior to swedging. While this invention has been described as incorporated in a cup-shaped ball joint housing, it is to be understood that the teachings of my invention can be applied to other types of movable stud joints.

Although the teachings of my invention have herein been discussed with reference to specific theories and embodiments, it is to be understood that these are by way of illustration only and that others may wish to utilize my invention different designs or applications.

I claim:

1. A method of manufacturing a movable stud ball joint which comprises the steps of: forming a housing with an interior cavity and a large diameter opening thereto surrounded by a relatively thin housing wall, assembling components of the join including a ball-ended stud into said housing, forming a cylindrical plug with threads around the periphery thereof, the major diameter of the threads less than the diameter of the said opening, placing the said plug into the said opening, and spin swedging the housing wall to reduce the inner diameter of the material of the wall around the plug to flow material from the wall into the threads of the plug to form mating female threads on the inner diameter of the wall.

2. A method of manufacturing a ball joint which comprises forming a housing with an interior cavity, providing a first opening through said housing communicating with said cavity, providing a second opening through said housing communicating with said cavity, the second opening having a larger diameter than the first opening, the second opening having a cylindrical housing wall defining the opening, inserting a stack of bearing components including a ball stud into said cavity through said second opening, inserting a cylindrical plug into said second opening, said plug having male threads around the periphery thereof, applying a force to said plug to preload said components, maintaining said load, spin-swedging the said cylindrical wall to constrict said wall around the said periphery of the said plug, cold-flowing material from the said wall into the grooves of the said male thread to form a corresponding female thread on the inner diameter of said cylindrical wall, and removing said load.

3. A method of manufacturing a movable stud plug closed joint housing which comprises the steps of forming a housing with a cavity therein and an opening through said housing into the cavity, the opening being defined by a relatively thin walled portion of the said housing, forming a substantially cylindrical plug, forming threads around the periphery of said plug, the threads extending substantially the axial length of the said plug, the threads having an incompletely formed portion, inserting the said plug into the said opening, constricting the said wall around the said plug and cold-flowing wall material into the said grooves of the said plug thereby forming a compatible female thread on the inner diameter of said wall, the female thread having a corresponding incompletely formed portion.

* * * * *